(12) United States Patent
Johnson

(10) Patent No.: US 7,726,933 B2
(45) Date of Patent: Jun. 1, 2010

(54) WIND POWERED TURBINE ENGINE—HORIZONTAL ROTOR CONFIGURATION

(75) Inventor: Bud T. J. Johnson, Calgary (CA)

(73) Assignee: Envision Corporation, City of Belmopan (BZ)

( * ) Notice: Subject to any disclaimer, the term of this patent is extended or adjusted under 35 U.S.C. 154(b) by 754 days.

(21) Appl. No.: 10/596,974

(22) PCT Filed: Dec. 17, 2004

(86) PCT No.: PCT/CA2004/002215

§ 371 (c)(1),
(2), (4) Date: Mar. 8, 2007

(87) PCT Pub. No.: WO2005/064154

PCT Pub. Date: Jul. 14, 2005

(65) Prior Publication Data

US 2007/0243058 A1    Oct. 18, 2007

(51) Int. Cl.
F03D 3/04    (2006.01)

(52) U.S. Cl. .......... 415/4.2; 415/4.4; 415/127; 415/211.2; 415/224

(58) Field of Classification Search ......... 415/4.2, 415/4.4, 127, 208.1, 224, 211.2, 907; 290/44, 290/55
See application file for complete search history.

(56) References Cited

U.S. PATENT DOCUMENTS

| | | | |
|---|---|---|---|
| 1,669,055 A | 5/1928 | Hogg | |
| 2,068,792 A | 1/1937 | Dekker | |
| 2,650,752 A | 9/1953 | Hoadley | |
| 2,664,961 A | 1/1954 | Goede | |
| 2,973,041 A | 2/1961 | Rabinow | |
| 3,209,156 A | 9/1965 | Struble | |
| 3,228,475 A | 1/1966 | Worthmann | |
| 3,339,078 A | 8/1967 | Crompton | |
| 4,021,135 A | 5/1977 | Pedersen et al. | |
| 4,070,131 A | 1/1978 | Yen | |
| 4,127,356 A | 11/1978 | Murphy | |
| 4,140,433 A | 2/1979 | Eckel | |
| 4,279,569 A * | 7/1981 | Harloff | 415/53.3 |
| 4,288,704 A | 9/1981 | Bosard | |
| 4,309,146 A | 1/1982 | Hein | |
| 4,320,304 A | 3/1982 | Karlsson et al. | |

(Continued)

FOREIGN PATENT DOCUMENTS

BE    567272 A    5/1958

(Continued)

OTHER PUBLICATIONS

English abstract of DE 4125691 Published on Feb. 4, 1993.

(Continued)

*Primary Examiner*—Ninh H Nguyen
(74) *Attorney, Agent, or Firm*—Osler, Hoskin & Harcourt LLP

(57) ABSTRACT

A wind powered turbine engine comprising an internalized containment and control chamber, intake enhancement, vacuum induction exhaust port and horizontally rotating rotor The turbine functions similarly to a steam or gas turbine engine. The radius of the control chamber decreases progressively as it curves around the periphery of the turbine rotor in the manner of a spiral.

19 Claims, 1 Drawing Sheet

U.S. PATENT DOCUMENTS

| | | | |
|---|---|---|---|
| 4,335,319 | A | 6/1982 | Mettersheimer |
| 4,350,900 | A | 9/1982 | Baughman |
| 4,411,588 | A | 10/1983 | Currah, Jr. |
| 4,416,584 | A * | 11/1983 | Norquest .................... 415/184 |
| 4,424,452 | A | 1/1984 | Francis |
| 4,868,408 | A | 9/1989 | Hesh |
| 5,038,049 | A | 8/1991 | Kato |
| 5,137,417 | A | 8/1992 | Lund |
| 5,375,968 | A | 12/1994 | Kollitz |
| 5,391,926 | A | 2/1995 | Staley |
| 5,457,346 | A | 10/1995 | Blumberg et al. |
| 5,852,331 | A | 12/1998 | Giorgini |
| 5,921,745 | A * | 7/1999 | Round et al. ................. 415/4.2 |
| 6,132,172 | A | 10/2000 | Li |
| 6,158,953 | A | 12/2000 | Lamont |
| 6,191,496 | B1 | 2/2001 | Elder |
| 6,270,308 | B1 * | 8/2001 | Groppel ...................... 415/4.3 |
| 6,382,904 | B1 | 5/2002 | Orlov et al. |
| 6,538,340 | B2 | 3/2003 | Elder |
| 6,638,005 | B2 * | 10/2003 | Holter et al. ................. 415/4.2 |
| 6,655,907 | B2 | 12/2003 | Brock |
| 6,740,989 | B2 | 5/2004 | Rowe |
| 6,849,964 | B2 | 2/2005 | Becherucci |
| 6,981,839 | B2 * | 1/2006 | Fan ............................ 415/4.1 |
| 7,214,029 | B2 | 5/2007 | Richter |
| 2004/0042894 | A1 | 3/2004 | Smith |

FOREIGN PATENT DOCUMENTS

| | | | |
|---|---|---|---|
| DE | 4125691 | A | 2/1993 |
| DE | 19526718 | | 1/1997 |
| FR | 547884 | | 12/1922 |
| FR | 2422047 | A2 | 11/1979 |
| GB | 545587 | A | 6/1942 |
| JP | 360029 | | 10/1947 |
| JP | 52009742 | | 1/1977 |
| JP | 52043047 | | 4/1977 |
| JP | 10089234 | | 4/1998 |
| JP | 11173253 | | 6/1999 |
| JP | 2001082314 | | 3/2001 |
| NZ | 507483 | | 3/2002 |
| RU | 2039308 | C1 | 7/1995 |
| RU | 2106524 | C1 | 3/1998 |
| RU | 2147693 | | 4/2000 |
| RU | 2166665 | | 5/2001 |
| RU | 2191288 | C1 | 10/2002 |
| RU | 12195 | U1 | 3/2008 |
| SU | 10199 | A1 | 6/1929 |
| SU | 74518 | A | 7/1949 |

OTHER PUBLICATIONS

Image Downloaded from http//en.wikipedia.org/wiki/image:Compr. Assiale.jpg; Flanker; Oct. 11, 2006.
Concise Explanation of the Relevance of Russian Patent No. RU12195 Published on Dec. 16, 1999, Done by Andrei Moskvitch; Montreal, Apr. 20, 2009.
English Abstract of French Patent No. FR2422047, Published on Nov. 2, 1979.
Abstract of Application NZ507483 published on Mar. 28, 2002.
Concise Explanation of the Relevance of French Patent No. FR547884, Published on Oct. 5, 1922, Done by Andrei Moskvitch; Montreal, Apr. 20, 2009.
English Abstract of Russian Patent RU2147693, Published on Apr. 20, 2000.
English Abstract of Russian Patent RU2191288, Published on Oct. 20, 2002.
Concise Explanation of the Relevance of Belgium Patent No. BE567272 Published on May 14, 1958, Done by Andrei Moskvitch; Montreal, Apr. 20, 2009.
Concise Explanation of the Relevance of Russian Patent No. RU2039308 Published on Jul. 9, 1995, Done by Andrei Moskvitch; Montreal 20, 2009.
Concise Explanation of the Relevance of Russian Patent No. RU2106524 Published on Mar. 10, 2009, Done by Andrei Moskvitch; Montreal, Apr. 20, 2009.
Concise Explanation of the Relevance of Soviet Union Inventor's Certificate No. SU74518 Published on Jul. 31, 1949, Done by Andrei Moskvitch; Montreal, Apr. 20, 2009.
Concise Explanation of the Relevance of Soviet Union Inventor's Certificate No. SU10199 Published on Apr. 29, 1929, Done by Andrei Moskvitch; Montreal, Apr. 20, 2009.
English abstract of JP 10-089234.
English abstract of JP 2001-082314.
English abstract of JP 11-173253.
English abstract of JP 52-043047.
English abstract of DE 19526718.

* cited by examiner

WIND POWERED TURBINE ENGINE—HORIZONTAL ROTOR CONFIGURATION

CROSS-REFERENCE TO RELATED APPLICATIONS

The present application is the United States National Stage of International Patent Application No. PCT/CA2004/002215 filed Dec. 17, 2004. Through the '215 application, this application claims the benefit of priority to Canadian Patent Application No. 2,452,965 filed Dec. 31, 2003.

BACKGROUND OF THE INVENTION

The inventor has studied examples of present state of the art wind turbines of the propeller type. It was apparent that with present state of the art wind turbines, certain improvements are necessary to capture and harness a higher percentage of energy from a given cross section of wind accessed by their propeller blades. It was also becoming quite apparent that present propeller types of wind turbines are reaching the upper limit of their size range. Economics of scale in their case, is to build and install large numbers of them. Land use, low frequency high intensity sound, with regard to animals, and aesthetic appearance, were other important considerations.

OBJECTS OF THE INVENTION

It had occurred to the inventor that successful attainment of the following objects would lead to the harnessing of a higher percentage of wind energy by wind turbines. The first would be an enlarged intake area in front of the turbine rotor. The second would be a containment and control chamber to assure maximum energy recovery from the captured wind. The third would be a means of increasing wind throughput velocity beyond prevailing wind speed as faced by the turbine unit. The fourth would be a means of compressing wind throughput. The fifth would be an exhaust area of lower atmospheric pressure. Placement, embodiment, enclosure and appearance also needed to be addressed, toward a completed unit package less imposing to the landscape, and less bothersome to birds and animals.

BASIC DESCRIPTION AND IMPROVEMENTS OVER PRESENT STATE OF THE ART

This invention harnesses wind energy by means of an internalized rotor, which has its blades situated at a comparatively long radius from its center. In this preferred embodiment, its blades are within the outer 40% of the radius of its rotor. That feature contributes to increased torque. Intake wind displaced by the blocked off inner 60% of the radius of its turbine rotor, is redirected to drive its blades, rather than becoming wasted energy. Also, this invention channels and increases the velocity of incoming wind, through a controlled chamber containing its turbine rotor, increasing wind compression as it drives the turbine blades, much the same as the functions of a steam or gas turbine engine. Controlled containment and direction of incoming energy, guided toward maximum thrust against turbine blades does result in a significant increase in captured energy. Gas and steam turbine engines are clear examples of the successful application of those principles.

A novel feature of this invention is its wind intake and throughput channel, which curves incoming wind by as much as one hundred and eighty degrees. This feature achieves three things in particular. Firstly, it increases throughput wind velocity. Secondly, its radius is progressively decreasing from the center of the turbine rotor, compressing incoming wind, increasing its density, and enhancing its ability to drive the rotor blades. Thirdly, it causes the wind throughput to constantly drive eight of twelve rotor blades, or two thirds of any number of blades one might place on the turbine rotor.

Theoretically, the potential amount of wind speed increase, as oncoming wind passes through the wind intake and throughput channel of this invention, would be based on ½ C over D (one half of the circumference of a full circle as would be defined by continuing the inner facing surface of the said throughput channel to form a full circle, divided by the diameter of that circle), and that figure comes to 1.57 to 1. However, usual drag factors, and some potential slow down related to compression will reduce that velocity increase quite significantly, perhaps by more than 25%. Nevertheless, any net increase in velocity of the oncoming air mass is going to increase available kinetic energy (watts per square meter) in cubic terms. A net wind speed increase of 25% would increase the available wattage per square meter by 1.25 cubed, or 1.95, and a 95% increase in available energy could be the end result. A 50% net increase in wind speed would increase available wattage by 1.50 cubed, or 3.375, and that becomes very significant.

With regard to a compression factor, that will also improve available kinetic energy per square meter. An increase in the mass or weight of the oncoming air mass is also a cubic function, as we calculate available wattage per square meter, and as with the velocity increase, a 25% compression factor could increase our available wattage per square meter by 95%.

The inventor refers to the above-mentioned means of velocity increase and creating compression as Kinetic Energy Enhancement, and further suggests that phrase should become common terminology for such means of increasing recoverable energy potential for wind power units.

With this invention, we now have a wind turbine engine, with an enlarged induction or intake area, followed by velocity increase and compression, within a chamber containing its turbine rotor, and with its wind throughput being ejected or exhausted into an area of lower pressure. Reduced pressure in the exhaust area is enhanced by means of controlled curvature and exhaust chamber shape.

Reduction in exhaust pressure is further enhanced by means of a wind bypass airfoil on the exterior wall of the turbine housing structure, which increases wind speed to provide an area of lower pressure (induction) at the outside periphery of the exhaust chamber exit port.

Another gainful feature is an air scoop curve on the left front side of the turbine intake area, which redirects and speeds up an enlarged area of incoming wind, toward more directly addressing the rotor blades, and increasing wind pressure in the direction of rotation.

This invention has an advantage, where present state of the art three bladed propeller types of wind turbines are reaching their upper limits of scale. This invention can be built to a large scale to generate a greater amount of electrical energy than the largest three bladed wind turbines of present state of the art. Capital cost per megawatt of electrical energy generated would be significantly reduced.

The inventor has designed a version of this invention, where its turbine rotor is 100 feet (30.48 meters) in diameter, with each of its blades being 800 square feet (74.32 square meters) in size. With eight of its twelve blades being driven at the same time, the wind is driving 6,400 square feet (595 square meters) of blade area. A very large amount of torque and useable horsepower would be produced, toward driving electrical generators, or any other mechanical means of harnessing such power output. This invention may be built to any scale which measures its cost against the value of its production of useable energy, within the limitations of proper engineering and available structural materials.

With regard to sudden changes in wind speed, which may have an adverse effect on present state of the art wind turbines, the compression area of this invention will tend to absorb such variations with no damage to the turbine, or to the outer boundary wall of its wind throughput channel. (The said outer boundary wall must be properly reinforced to accommodate such surges and pressure.) It may be further noted that a 100 foot (30.48 meter) diameter rotor would be rotating at only about 20 revolutions per minute, with wind going through its wind throughput channel at seventy miles (112.65 kilometers) per hour, assuming the speed of the outer circumference of the rotor to be the same as the wind speed. The largest three bladed propeller wind turbines of present state of the art stand as high as three hundred feet (91.44 meters) above the ground, when measured from ground level to the top of the circumference of their blade tip path of rotation. This invention, of carousel configuration, with a single 100 foot (30.48 meter) diameter rotor, would stand about 100 feet high (30.48 meters) from ground level to its rooftop, with its floor level being thirty feet (9.144 meters) above ground level. It would be far less than half the height of the largest three bladed propeller turbine, which is present state of the art.

Aesthetically and environmentally, this invention may appear more desirable than present state of the art wind turbines. It will present an aesthetically unimposing profile, which should blend more easily with the environment. Its ground base mound can be seeded to grass, and its containment structure may look attractive. In the matter of damage to birds in particular, that is quite unlikely at any time. They could simply fly through its wind throughput channel, increasing their speed on the way through. Another problem locally characteristic of large three bladed wind turbines is high intensity low frequency sound. This invention is unlikely to create such a sound problem, and it may not be a bothersome or limiting challenge to apply sound abatement to its type of shape and structure if that should become necessary.

The inventor readily expects that smaller models of this invention could be placed on the roof of a building, or on a framework or tower, to capture wind energy for specific needs. Smaller models are also envisioned, with their turbine rotor mounted on a horizontal axle.

Variations in the scooped, curved or segmented nature of its turbine rotor blades, and further input, throughput and aperture enhancements are also envisioned by the inventor, and such modifications would become obvious to anyone skilled in the art.

The inventor's further general comments with regard to the subject invention are that he has in this case, simply invented a wind turbine engine, as a straightforward concept. Further details beyond those presented herein, concerning floor rotation, rotor bearings, Mechanicals, power transmission drives and systems are all presently known and readily available, either as clearly defined concepts or available products on the market. Those items as may be considered essential to this invention are considered to be matters of mechanical engineering, or the properly engineered use of state of the art technology.

DETAILED DESCRIPTION

Figures 1, 2:
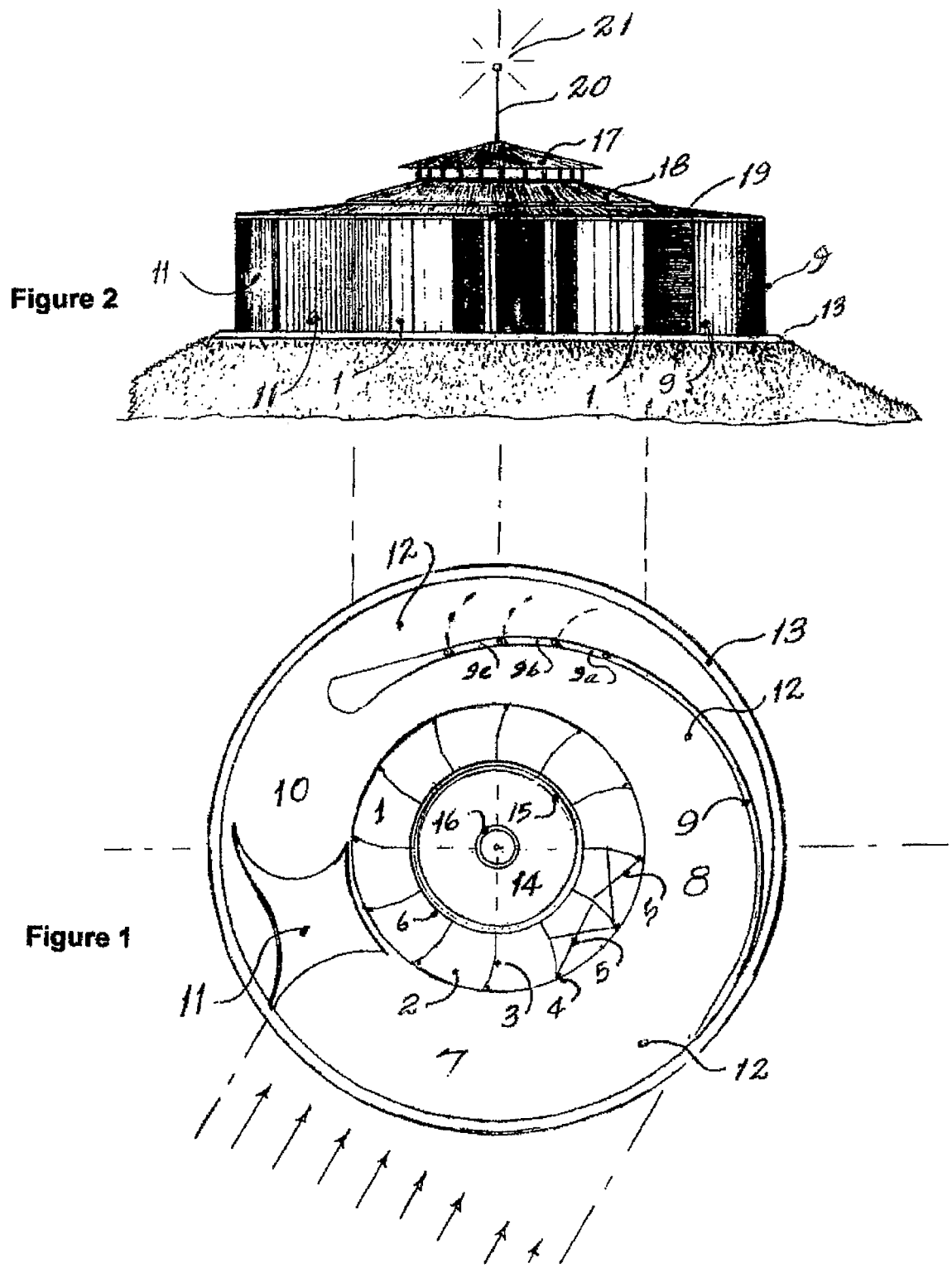
FIG. 1 is a vertical floor plan view of a preferred embodiment of the invention. It is anticipated that a floor plan and rotor reversal might be in order in some situations.
FIG. 2 is a frontal view of the same embodiment, more completely illustrating its wind capture aperture and relative rotor placement, as it would appear in operating mode, fully assembled on site, within its building enclosure, with wind capture aperture set to full operating position, as shown in FIG. 1.

With all of the foregoing in view, and such other and further purposes, advantages or novel features as may become apparent from consideration of this disclosure and specification, the present invention consists of the inventive concept which is comprised, embodied, embraced or included in various specific embodiments of such concept, reference being made to the accompanying figures, in which:

FIG. 1 is a vertical floor plan view of a preferred embodiment of the subject invention, where turbine rotor assembly 1, consists of flat, circular base plate 2, at its bottom, and another of the same at its top (not shown), turbine blades 3, with progressive slight bends, to produce a partial scoop effect, blade strength, and stability, and may further provide added surface tension to the rotor blades, as may be desirable in this type of arrangement. Then we have blade tip reinforcement strips or pieces 4, and reinforcement tubes or cables 5, cylindrical turbine rotor axle tube 6, wind intake aperture area 7, wind flow and compression channel 8, outer boundary containment wall 9, with higher strength ejection end for pressure containment, which is curved to increase ejection velocity and reduce exiting wind pressure. Outer boundary containment wall 9, has three short sections thereof, 9a, 9b and 9c, which may be opened from partially to completely open, for the purpose of reducing wind compression which may become too great for the said wall 9, to tolerate, such as in the case of very high wind speeds, when we want to continue to harness the wind energy, without damaging the turbine housing structure. Then we have lower pressure wind ejection area 10, with its function further augmented by the rear curved face of wind barrier and flow guide assembly 11, which also has a curved front side to speed up, direct and partially compress incoming wind against turbine blades 3, in wind intake aperture area 7, and further, with its left side compound airfoil curve, it increases bypass wind velocity on its outer left side, inducing the wind in a particular fashion to enhance pressure reduction, and to create induction in low pressure wind ejection area 10.

Then we have horizontal circular flat floor section 12, which may be rotated as desired, to access wind direction, or to a position where wind intake aperture area 7, and wind ejection area 10, are not accessed by extremely high winds.

Then we have fixed horizontal circular flat outer periphery floor ring 13, with beveled top outside edge around its circumference, and then fixed horizontal circular flat floor section 14, extending inward to center, from a radius point slightly outside of the turbine rotor, and continuing underneath turbine rotor 1, to the outer periphery of stairway/elevator tube 16, located at the center of the structure. Then we have vertical cylindrical structural support wall 15, beginning close to the inside axle tube of the turbine rotor, and extending upward. Then we have vertical round cylindrical stairway and/or elevator tube 16, extending from below floor section 14, directly upward, concentric with structural support wall 15.

Structural support wall 15, serves a series of purposes, including concentric suspension and support for axle tube 6, of turbine rotor 1, at its lower and upper inside surface, and further supports office and control room 17, and fixed building roof section 18, as shown on figure two, and the said building roof section extends radially outward from said support wall 15, to a point beyond the outside top edge of turbine rotor 1.

Support wall 15, will be radially cross connected to the outside face of stairway/elevator tube 16, at floor level intervals, perhaps each ten feet, to add stability and strength to the overall turbine housing structure, and to allow added floor levels, if desired.

Stairway/elevator tube 16, will extend upward from a point well below the base of floor segment 14. A curve topped underground passageway (not shown) will extend laterally through the mounting mound or hilltop upon which the turbine engine unit is placed, to an outside point at ground level, to provide access for operating and maintenance personnel, and necessary pieces of equipment. Stairway/elevator tube 16, will further extend upward to just below the rooftop of office and control room 17,as shown on figure two, for adequate placement of proper elevator and related drive system. It should be further noted, that a spiral stairway is to be placed around the outside periphery of tube 16. From the surface of floor 14, a further stairway should extend downward to the underground passageway mentioned above, so personnel will have adequate emergency entry and exit provisions in case of elevator failure.

Figure two illustrates the completed placement of the wind turbine engine unit, with office and control room 17, at the top, and fixed round sloping roof segment or section, 18, radially attached to structural support wall 15, as shown in figure one, and then we have outer roof segment or section 19, shown on FIG. 2, which is base mounted to rotatable floor section 12, as shown in FIG. 1, by means of carefully spaced and interconnected vertical pillar tubes (not shown), enclosing the area between fixed roof section 18, as shown on FIG. 2, and outer wind channel containment wall 9, as shown on FIG. 1.

Also shown on FIG. 2, is extended support pole or tube 20, for navigational clearance light 21, usually essential for tall structures in open areas, in most states and countries.

Rather than break the continuity of the above description, and as shown on figure one, we had not mentioned that all power take-off systems, electrical generators, related mechanicals, and devices including basic electrical switch gear etc., could be placed at ground floor level on fixed inner floor section 14, with some essentials somewhat recessed downward below floor level, between cylindrical support wall 15, and center elevator tube 16. Also, there will be a series of arched and round openings in cylindrical support wall 15, for access to bearings, drive components concentric centering rollers etc., to allow easy access for essential lubrication, and maintenance.

Electrical power cables to deliver generated power to outside connections would be brought from the generator area, on or below fixed inner floor section 14, downward to exit by means of the access tunnel leading in from outside the turbine engine base mounting hill or mound.

What is claimed is:

1. A wind turbine, comprising:
    a rotor having a plurality of blades, the rotor being rotatable about a rotation axis;
    a wind containment wall extending in part around the rotor, the wind containment wall having a radius defined with respect to the rotor rotation axis;
    a wind compression channel defined between the wind containment wall and the rotor, the wind compression channel having an intake and an exhaust, the radius of the containment wall decreasing between the wind compression channel intake and the wind compression channel exhaust;
    wind flowing through the channel contacting the blades causing the rotor to rotate;
    an intake air flow guide having a face curved to direct wind into the intake;
    an exhaust air flow guide having a face curved to direct wind exiting the exhaust out of the turbine; and
    the wind containment wall, the intake air flow guide, and the exhaust air flow guide being rotatable about the rotor rotation axis, independently of the rotor, to address wind direction.

2. The wind turbine of claim 1, further comprising a wind bypass airfoil increasing air wind speed to provide an area of lower pressure to induce air to exit the turbine.

3. The wind turbine of claim 2, wherein the intake air flow guide, the exhaust air flow guide, and the wind bypass airfoil are all part of a wind barrier and flow guide assembly.

4. The wind turbine of claim 3, wherein the rotor has a radius defined with respect to the rotor rotation axis, and the blades are disposed within an outer 40% of the radius of rotor.

5. The wind turbine of claim 4, wherein an inner 60% of the radius of the rotor is blocked off.

6. The wind turbine of claim 5, wherein the wind containment wall, the intake air flow guide, and the exhaust air flow guide are disposed on a rotatable horizontal flat floor.

7. The wind turbine of claim 6, wherein the radius of the containment wall progressively decreases between the wind compression channel intake and the wind compression channel exhaust.

8. The wind turbine of claim 7, wherein the wind containment wall has openable sections to reduce wind compression.

9. The wind turbine of claim 8, wherein the blades are bent to form an air scoop.

10. The wind turbine of claim 9, wherein the rotor rotation axis is vertical.

11. The wind turbine of claim 1, wherein the rotor includes a base plate and a top plate.

12. The wind turbine of claim 1, wherein the rotor rotation axis is vertical.

13. The wind turbine of claim 1, wherein the wind containment wall has openable sections to reduce wind compression.

14. The wind turbine of claim 1, wherein the blades are bent to form an air scoop.

15. The wind turbine of claim 1, wherein the wind containment wall, the intake air flow guide, and the exhaust air flow guide are disposed on a rotatable horizontal flat floor.

16. The wind turbine of claim 1, wherein the radius of the containment wall progressively decreases between the wind compression channel intake and the wind compression channel exhaust.

17. The wind turbine of claim 1, further comprising a generator operatively connected to the rotor.

18. The wind turbine of claim 1, wherein the rotor has a radius defined with respect to the rotor rotation axis, and the blades are disposed within an outer 40% of the radius of rotor.

19. The wind turbine of claim 1, wherein an inner 60% of the radius of the rotor is blocked off.

* * * * *